US011339868B2

United States Patent
Hosoh et al.

(10) Patent No.: US 11,339,868 B2
(45) Date of Patent: May 24, 2022

(54) VEHICLE DRIVING APPARATUS

(71) Applicant: Daimler AG, Stuttgart (DE)

(72) Inventors: Toshikazu Hosoh, Kawasaki (JP); Shogo Takeda, Kawasaki (JP)

(73) Assignee: Daimler AG, Stuttgart (DE)

( * ) Notice: Subject to any disclaimer, the term of this patent is extended or adjusted under 35 U.S.C. 154(b) by 141 days.

(21) Appl. No.: 16/626,465

(22) PCT Filed: May 2, 2018

(86) PCT No.: PCT/JP2018/017533
§ 371 (c)(1),
(2) Date: Dec. 24, 2019

(87) PCT Pub. No.: WO2019/003634
PCT Pub. Date: Jan. 3, 2019

(65) Prior Publication Data
US 2020/0224757 A1 Jul. 16, 2020

(30) Foreign Application Priority Data
Jun. 30, 2017 (JP) .............................. JP2017-128453

(51) Int. Cl.
*F16H 57/03* (2012.01)
*B60K 1/00* (2006.01)
(Continued)

(52) U.S. Cl.
CPC ............... *F16H 57/03* (2013.01); *B60K 1/00* (2013.01); *B60K 17/16* (2013.01); *F16H 57/037* (2013.01);
(Continued)

(58) Field of Classification Search
CPC .... F16H 57/03; F16H 57/037; F16H 57/0416; F16H 57/0415; B60K 1/00; B60K 17/16; B60K 2001/001
See application file for complete search history.

(56) References Cited

U.S. PATENT DOCUMENTS 2,577,188 A * 12/1951 Hall .................... F01M 11/0004
184/106
4,022,272 A * 5/1977 Miller ...................... F01P 11/08
165/51

(Continued)

FOREIGN PATENT DOCUMENTS

JP      50-90970 U     7/1975
JP     11-180162 A     7/1999
(Continued)

OTHER PUBLICATIONS

EPO Translation of the Description of JP 2002005270 A, Ikeda, Jan. 2002. (Year: 2021).*
(Continued)

*Primary Examiner* — Daniel D Yabut
(74) *Attorney, Agent, or Firm* — Crowell & Moring LLP

(57) ABSTRACT

A vehicle driving apparatus is capable of reducing vehicle weight and manufacturing cost while improving performance of heat dissipation from a speed reduction mechanism. The vehicle driving apparatus includes a motor, which is incorporated in a vehicle, a speed reduction mechanism, which transmits driving force produced by the motor to a differential gear of the vehicle, and a housing structure, which accommodates the speed reduction mechanism and the differential gear. The housing structure includes a rear cover, adjacent to the speed reduction mechanism, and a rib structure, provided on the rear cover, and the rib structure is (Continued)

provided along the direction in which the vehicle travels and integrated with the rear cover.

2 Claims, 7 Drawing Sheets

(51) Int. Cl.
    *B60K 17/16*     (2006.01)
    *F16H 57/037*     (2012.01)
    *F16H 57/04*     (2010.01)
    *F16H 57/02*     (2012.01)

(52) U.S. Cl.
    CPC .... *B60K 2001/001* (2013.01); *F16H 57/0483* (2013.01); *F16H 57/0493* (2013.01); *F16H 2057/02052* (2013.01)

(56) References Cited

U.S. PATENT DOCUMENTS

2015/0375783 A1* 12/2015 Yamamoto ............. B62D 9/002
                                                                        180/253
2019/0024731 A1* 1/2019 Valente ................ F16H 57/031

FOREIGN PATENT DOCUMENTS

| JP | 2002005270 A | * | 1/2002 | ......... F16H 57/0415 |
| WO | WO-9104427 A1 | * | 4/1991 | ......... F16H 57/0415 |
| WO | WO-2013038943 A1 | * | 3/2013 | ............... B60K 6/52 |
| WO | WO 2014/148410 A1 | | 9/2014 | |

OTHER PUBLICATIONS

Japanese-language Office Action issued in Japanese Application No. 2017-128453 dated Apr. 15, 2020 with English translation (five (5) pages).

International Search Report (PCT/ISA/210) issued in PCT Application No. PCT/JP2018/017533 dated Aug. 7, 2018 with English translation (three pages).

Japanese-language Written Opinion (PCT/ISA/237) issued in PCT Application No. PCT/JP2018/017533 dated Aug. 7, 2018 (four pages).

Japanese-language Office Action issued in Japanese Application No. 2017-128453 dated Nov. 11, 2020 with English translation (five (5) pages).

* cited by examiner

VEHICLE DRIVING APPARATUS

BACKGROUND OF THE INVENTION

1. Field of the Invention

The present invention relates to a vehicle driving apparatus.

2. Description of Related Art

An electric car using a motor as a drive source for allowing the vehicle to travel typically includes a driving apparatus including the motor and a speed reduction mechanism formed of a plurality of gears, and driving force produced by the motor is transmitted to driving wheels via the driving apparatus and a differential gear. For example, the publication identified below discloses a driving apparatus that allows an electric car to travel by using electric power from a battery incorporated in the vehicle.

In recent years, from a viewpoint of reduction in burden on the environment, electric cars including no internal combustion engine are being developed not only in the field of passenger cars but in the field of medium/large-size vehicles, such as trucks. For example, attention is directed toward an electrically powered truck that uses the driving apparatus described above to travel only with electric power from the battery with no engine incorporated. Since such an electrically powered truck has a vehicle weight greater than that of a passenger car, the weight of each component incorporated in the truck needs to be reduced not only to maximize the travel distance achieved by the electric power capacity of the incorporated battery but to prevent decrease in the upper-limit weight of a cargo loaded, for example, on the bed of the truck.

One publication that is of interest is International Publication No. WO 2014/148410.

SUMMARY OF THE INVENTION

On the other hand, since the driving apparatus incorporated in an electrically powered truck described above produces driving torque greater than that of a passenger car, the temperature of a lubricant used in the speed reduction mechanism tends to increase. Providing the speed reduction mechanism with a separate heat dissipation mechanism, however, prevents reduction in the weight of the driving apparatus. Further, for example, forming a thin cast housing of the speed reduction mechanism to reduce the weight of the driving apparatus is likely to cause deformation of the housing in the casting step, resulting in decrease in the yield of the housing and hence possible increase in manufacturing cost.

The present invention has been made in view of the circumstances described above, and an object of the present invention is to provide a vehicle driving apparatus capable of reducing the vehicle weight and manufacturing cost while improving performance of heat dissipation from the speed reduction mechanism.

A first aspect of the present invention relates to a vehicle driving apparatus including a motor incorporated in a vehicle, a speed reduction mechanism that transmits driving force produced by the motor to a differential gear of the vehicle, and a housing structure that accommodates the speed reduction mechanism and the differential gear. The housing structure includes a cast plate member so provided as to be adjacent to the speed reduction mechanism and a rib structure provided on the cast plate member, and the rib structure is provided along a direction in which the vehicle travels and integrated with the cast plate member.

The cast plate member, which is so provided as part of the housing structure as to be adjacent to the speed reduction mechanism, is integrated with the rib structure, which is provided along the direction in which the vehicle travels and therefore increases the surface area of the cast plate member without blocking air flowing along the cast plate member. The thus configured vehicle driving apparatus does not need to be newly or separately provided with a heat dissipating mechanism, such as heat dissipating fins or does not need to employ a connection member for attaching the heat dissipating mechanism. Therefore, the vehicle driving apparatus can dissipate heat from a lubricant in the speed reduction mechanism via the housing structure with no increase in weight. Further, the rib structure is provided on the cast plate member and along the direction in which the vehicle travels and therefore functions as a member that reinforces the cast plate member, whereby the thickness and hence the weight of the cast plate member can be reduced. Further, the rib structure can prevent deformation of the cast plate member, for example, lengthwise warpage of the cast plate member even when the cast plate member is casted in a thin shape, whereby the yield of the cast plate member in the manufacturing stage can be improved, which leads to suppression of manufacturing cost. The vehicle driving apparatus according to the present invention therefore allows improvement in performance of heat dissipation from the speed reduction mechanism and reduction in the vehicle weight and manufacturing cost. The "direction in which the vehicle travels" used herein is the flow direction of vehicle travel air produced around the vehicle driving apparatus when the vehicle travels and is not limited to the horizontal direction in which the vehicle travels.

A second aspect of the present invention relates to the vehicle driving apparatus in which in the first aspect of the present invention described above, the rib structure includes a plurality of partial ribs provided along the direction in which the vehicle travels, and the plurality of partial ribs are so arranged as to overlap with each other in the direction in which the vehicle travels.

The cast plate member is seamlessly reinforced by the partial ribs in the lengthwise direction, and the air flow produced when the vehicle travels is not blocked by the plurality of partial ribs. As a result, in comparison of the form of the cast plate member described above with the form of a cast plate member in which the rib structure continuously extends in the lengthwise direction of the cast plate member, the partial ribs can be arranged with increased flexibility. The thus configured cast plate member allows increase in the number of partial ribs arranged in a region where further reinforcement is required or a region where a greater heat dissipation effect is required but decrease in the number of partial ribs in the other region for more effective improvement in the performance of heat dissipation from the speed reduction mechanism and reduction in vehicle weight and manufacturing cost.

A third aspect of the present invention relates to the vehicle driving apparatus in which in the first or second aspect of the present invention described above, the cast plate member has a contact surface that comes into contact with a shaft receiver that supports the speed reduction mechanism, and the rib structure is so disposed that an area where the rib structure and the contact surface overlap with each other is maximized in a plan view of the cast plate member.

The shaft receiver that supports the speed reduction mechanism is a portion on which a load resulting from driving operation particularly tends to concentrate and increase in temperature tends to occur. The shaft receiver is in direct contact with the cast plate member as part of the housing structure. Further, the rib structure is so disposed that the area where the contact surface and the rib structure overlap with each other in the respective surfaces thereof is maximized. The rib structure can therefore efficiently suppress the increase in the temperature of the shaft receiver.

DETAILED DESCRIPTION OF THE INVENTION

Embodiments of the present invention will be described below in detail with reference to the drawings. The present invention is not limited to the contents described below and can be arbitrarily changed to the extent that the change does not change the substance of the present invention. Further, the drawings used to describe the embodiments each diagrammatically show constituent members, and each of the constituent members is partially enhanced, enlarged, reduced, omitted, or otherwise deformed for further understanding and therefore does not accurately show the scale, shape, and other factors of the constituent member in some cases.

First Embodiment

Figure 1:
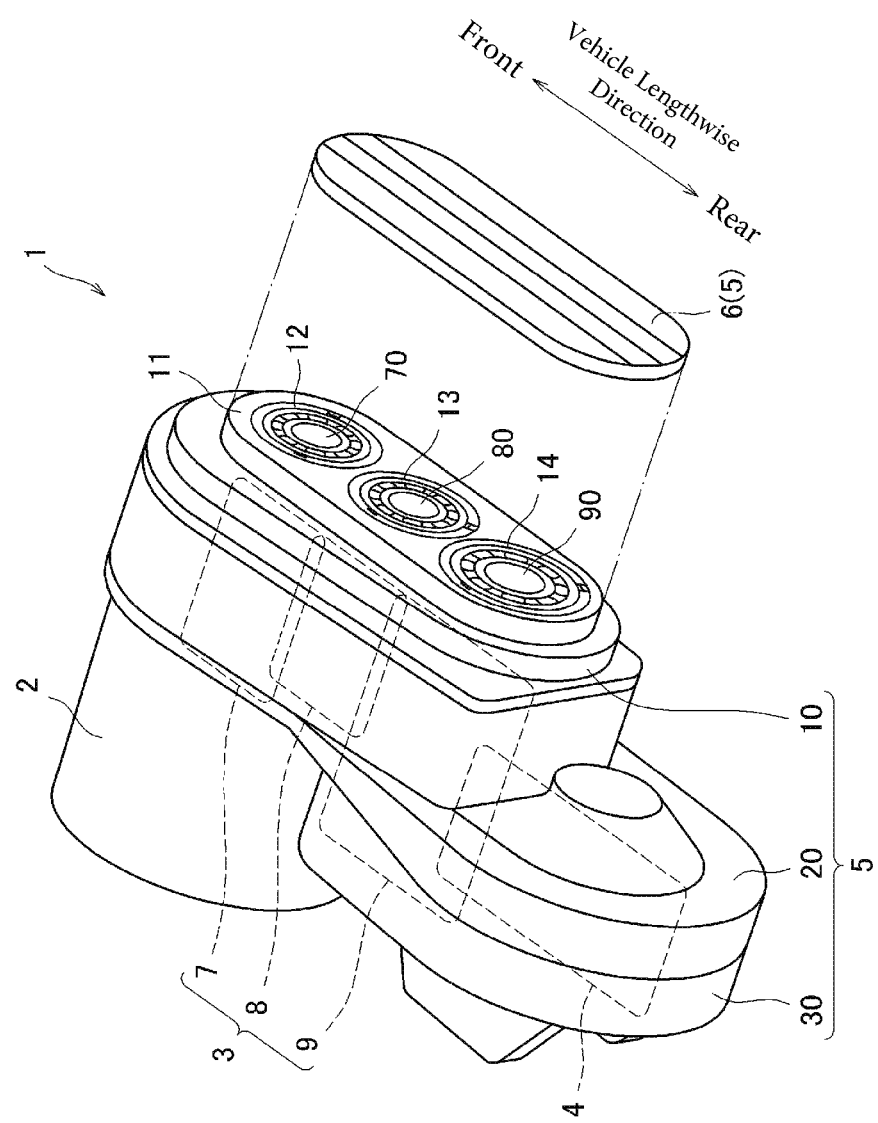
FIG. 1 is a perspective view of vehicle driving apparatus according to a first embodiment of the present invention.

FIG. 1 is a perspective view of a vehicle driving apparatus 1 according to a first embodiment of the present invention. The vehicle driving apparatus 1 is a drive source that is so incorporated in an electrically powered vehicle as to be oriented in the direction labeled with the arrow representing the vehicle length direction in FIG. 1, and the vehicle driving apparatus 1 converts supplied electric power into power that allows the vehicle to travel. The vehicle driving apparatus 1 includes a motor 2, a speed reduction mechanism 3, a differential gear 4, and a housing structure 5. FIG. 1 shows a state in which a rear cover 6, which serves as a "cast plate member," which is part of the housing structure 5, is removed from the housing structure 5.

The motor 2 converts electric power supplied from a battery (not shown) incorporated along with the vehicle driving apparatus 1 in the vehicle into rotary motion and outputs the rotary motion.

The speed reduction mechanism 3 is formed of an input gear 7, a middle gear 8, and an output gear 9, which are linked to each other to form a gear mechanism, and the speed reduction mechanism 3 reduces the speed of the rotary motion inputted from the motor 2 to the input gear 7 to a rotary speed appropriate for travel of the vehicle and outputs the resultant rotary motion via the output gear 9. A gear shaft 70 of the input gear 7, a gear shaft 80 of the middle gear 8, and a gear shaft 90 of the output gear 9 are arranged in parallel to one another with the ends of the shafts on one side opposite the motor 2 aligned with one another. It is noted that the number of gears provided in the speed reduction mechanism 3 is not limited to three.

A rotating shaft of the differential gear 4 is linked to an axle (not shown) of driving wheels of the vehicle and transmits the rotary motion outputted via the output gear 9 to the driving wheels to rotate the driving wheels. The vehicle driving apparatus 1 can thus rotate the driving wheels of the vehicle with the driving force produced by the motor transmitted via the speed reduction mechanism 3 and the differential gear 4 to allow the vehicle to travel.

The housing structure 5 is an aluminum enclosure that is linked to the motor 2, protects and holds the speed reduction mechanism 3 and the differential gear 4 accommodated in the housing structure 5, and prevents outside leakage of a lubricant used to lubricate the speed reduction mechanism 3 and the differential gear 4. The speed reduction mechanism 3 and the differential gear 4 are accommodated in the single housing structure 5 in the present embodiment but may instead be separately accommodated in two housings as long as the speed reduction mechanism 3 and the differential gear 4 are linked to each other.

The housing structure 5 may be formed, for example, of the rear cover 6, a right housing 10, a middle housing 20, and a left housing 30, which are arranged in the lengthwise direction of the plurality of gear shafts 70, 80, 90 provided in the speed reduction mechanism 3. In this case, the gear shafts 70 and 80 are accommodated in the right housing 10 and the middle housing 20. The gear shaft 90 is accommodated in the right housing 10, the middle housing 20, and the left housing 30, as shown in FIG. 1. The differential gear 4 is so accommodated as to be sandwiched by the middle housing 20 and the left housing 30 with one end of the differential gear 4 facing the middle housing 20 and the other end thereof facing the left housing 30.

The right housing 10 is provided with a linkage surface 11, which forms part of the outer surface of the housing structure 5 and to which the rear cover 6 is linked. A plurality of openings 12, 13, and 14 are so formed in the right housing 10 as to pass through the inner side of the housing structure 5 and the linkage surface 11, as will be described later in detail. The gear shafts 70, 80, and 90 are so arranged that the one-side ends thereof aligned with one another reach the linkage surface 11 from the openings 12, 13, and 14.

The rear cover 6 is a cast plate-shaped member made of a metal, for example, aluminum. The rear cover 6, when linked to the linkage surface 11 of the right housing 10, covers the openings 12, 13, and 14 to seal the housing structure 5. The structure of the rear cover 6 will also be described later in detail.

Figure 2:
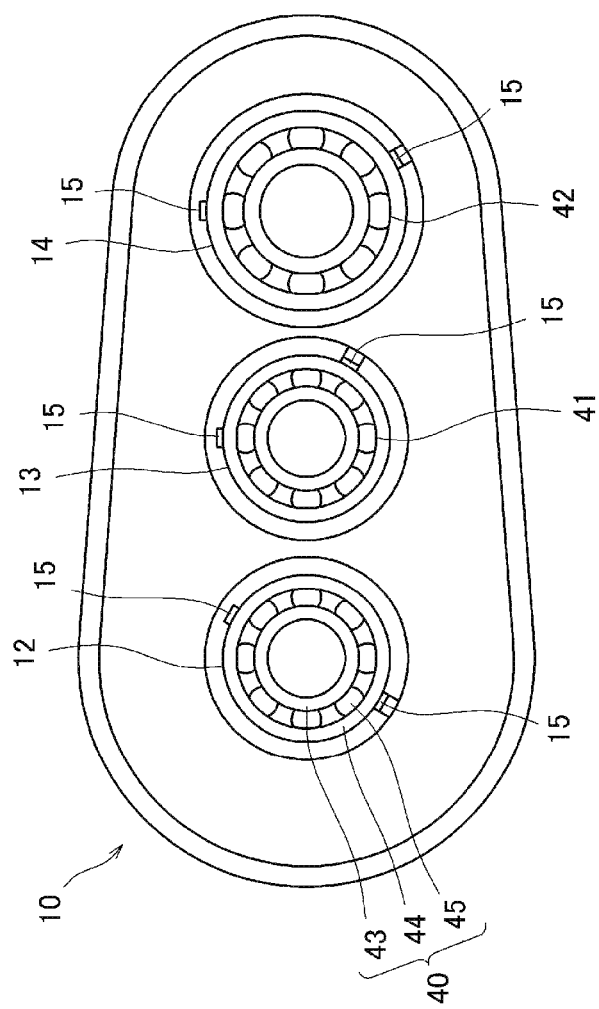
FIG. 2 is a side view of a right housing with which the vehicle driving apparatus is provided.

The structure of the right housing 10 will next be described in detail. FIG. 2 is a side view of the right housing 10, with which the vehicle driving apparatus 1 is provided, and is in more detail a side view of the right housing 10 viewed from the side facing the interior of the housing structure 5.

The openings 12, 13, and 14, which pass from the inner side of the housing structure 5 to the linkage surface 11, are so formed in the right housing 10 as to have circular shapes with the centers thereof located in positions corresponding to the gear shafts 70, 80, and 90. Bearings 40, 41, and 42 are attached to the openings 12, 13, and 14, respectively.

The bearing 40 is formed of an inner race 43, an outer race 44, and a plurality of balls 45. The inner race 43 is an annular member having an inner circumferential surface to which the gear shaft 70 is connected. The outer race 44 is an annular member having an inner circumferential surface that surrounds the outer circumferential surface of the inner race 43 and an outer circumferential surface that is fixed to the opening 12 of the right housing 10. The plurality of balls 45 are arranged between the inner race 43 and the outer race 44. The thus configured bearing 40 functions as a shaft receiver that allows the right housing 10 to rotatably support the gear shaft 70. The gear shafts 80 and 90, each of which has the same configuration as that of the gear shaft 70, is rotatably supported by the right housing 10 via the bearings 41 and 42, each of which functions as a shaft receiver.

Cutout-shaped through holes 15, which pass from the inner side of the housing structure 5 to the linkage surface 11, are formed in the right housing 10 at two locations around the circumference of each of the openings 12, 13, and 14. Therefore, even in a state in which the one-side ends of the gear shafts 70, 80, and 90 are connected to the openings 12, 13, and 14 via the bearings 40, 41, and 42, respectively, the opposite surfaces of the right housing 10 communicate with each other via the plurality of through holes 15.

The side surfaces of the bearings 40, 41, and 42 and the one-side front ends of the gear shafts 70, 80, and 90 are so disposed as to be flush with the linkage surface 11 of the right housing 10, as shown in FIG. 1.

Figure 3:
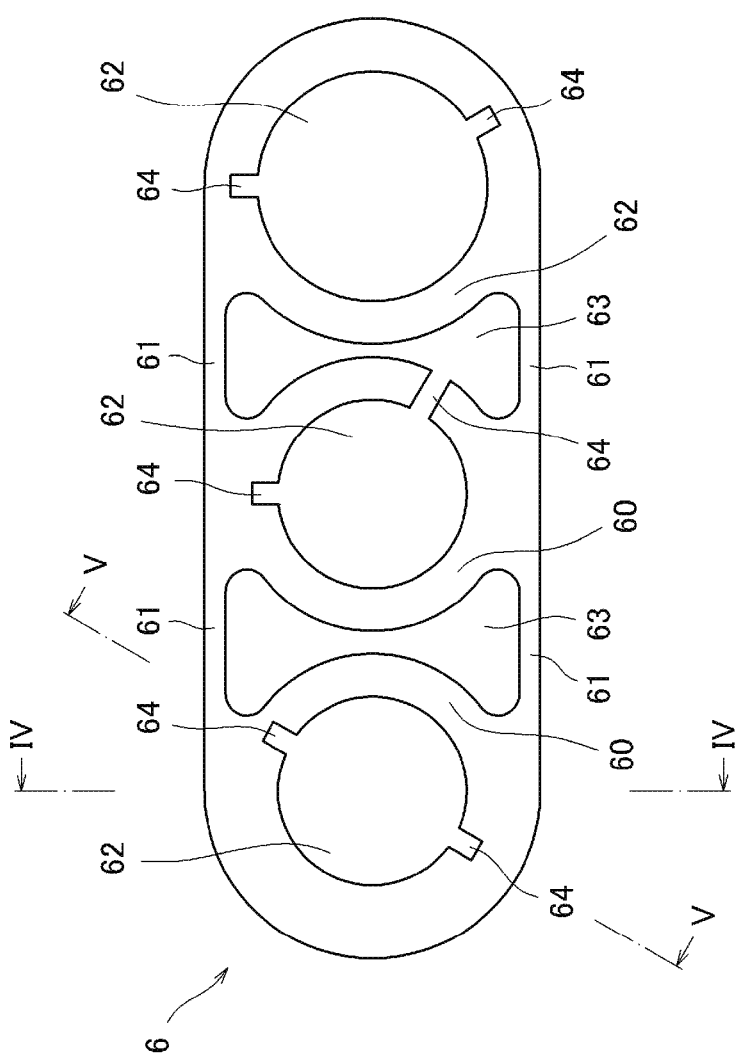
FIG. 3 is a side view showing the inner surface of a rear cover with which the vehicle driving apparatus is provided.

The structure of the rear cover 6 will subsequently be described in detail. FIG. 3 is a side view showing the inner surface of the rear cover 6, with which the vehicle driving apparatus 1 is provided. More specifically, FIG. 3 is a side view showing the structure of the inner surface of the rear cover 6 viewed from the side facing the right housing 10.

A plurality of shaft receiver seat surfaces 60, which come into the outer races 44 of the bearings 40, 41, and 42 when the rear cover 6 is linked to the linkage surface 11 of the right housing 10, are formed in the rear cover 6. The shaft receiver seat surfaces 60 are each an annular portion so formed as to protrude toward the right housing 10 and to be therefore thicker than the surrounding portions and further so formed that at least the inner diameter of each of the shaft receiver seat surfaces 60 overlaps with the corresponding outer race 44. Further, the rear cover 6 is provided with a sealing seat surface 61, which is so formed as to extend along the outer circumference of the inner surface of the rear cover 6 and to protrude toward the right housing 10 and to be therefore thicker than the other portion. The shaft receiver seat surfaces 60 and the sealing seat surface 61 are integrated with each other in portions where they are close to each other. The rear cover 6, when so linked to the right housing 10 that the shaft receiver seat surfaces 60 and the sealing seat surface 61 are flush with the linkage surface 11, seals the housing structure 5 having the openings 12, 13, and 14 formed therein.

Since the shaft receiver seat surfaces 60 and the sealing seat surface 61 are provided, the rear cover 6 has first recessed sections 62, which are located inside the shaft receiver seat surfaces 60 and relatively thinner than them, and second recessed sections 63, which are located between the shaft receiver seat surfaces 60 and the sealing seat surface 61 and relatively thinner than them. In the present embodiment, since the speed reduction mechanism 3 includes the three gear shafts 70, 80, and 90, the rear cover 6 has three first recessed sections 62 formed in correspondence with the three gear shafts and two second recessed sections 63 formed between the three first recessed sections 62.

Two third recessed sections 64, which are as thin as the first recessed sections 62, are formed at two locations around each of the plurality of first recessed sections 62, each of which is formed in a circular shape. The third recessed sections 64 are so arranged as to correspond to the plurality of through holes 15 formed in the right housing 10 and shown in FIG. 2.

Figure 4:
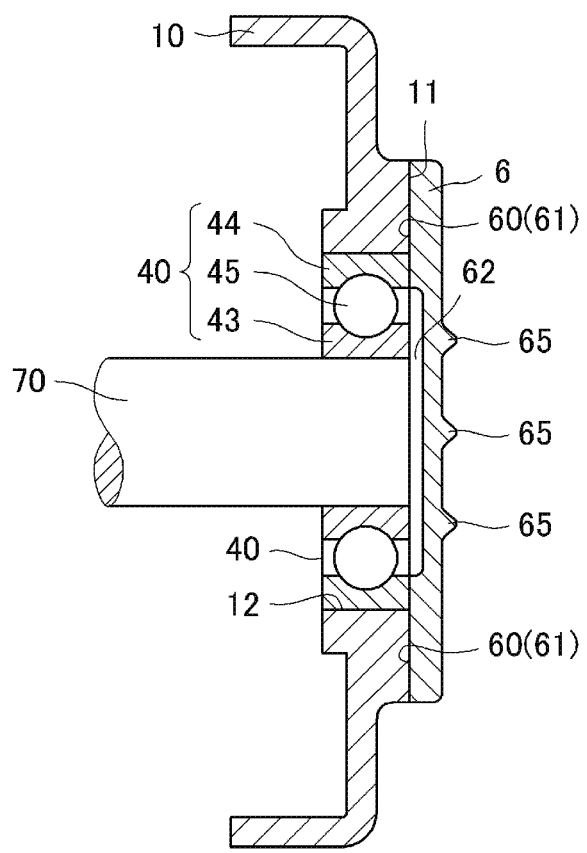
FIG. 4 is a cross-sectional view of the right housing and the rear cover.
Figure 5:
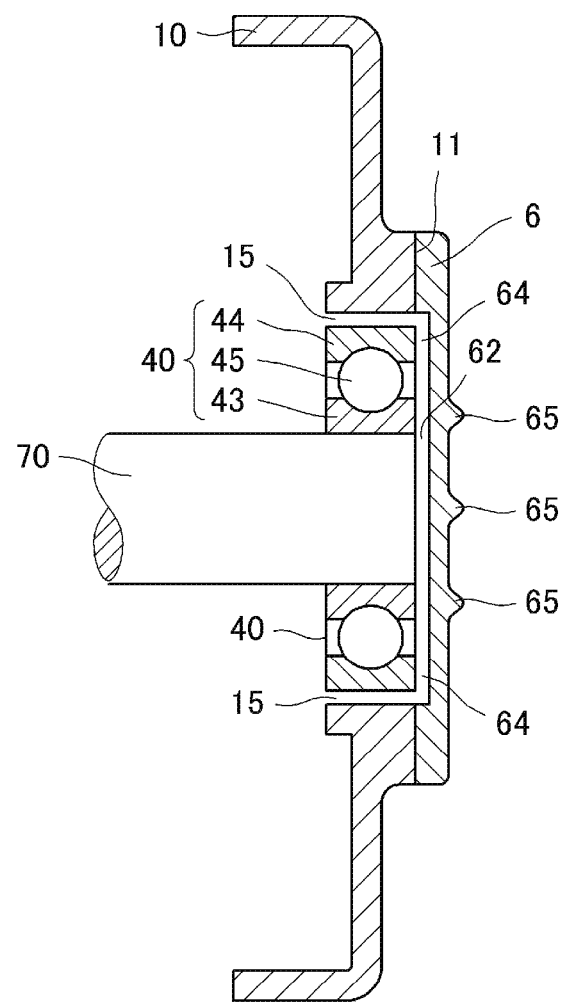
FIG. 5 is another cross-sectional view of the right housing and the rear cover.

The form of connection between the rear cover 6 and the right housing 10 will next be described. FIGS. 4 and 5 are cross-sectional views of the right housing 10 and the rear cover 6. More specifically, FIG. 4 shows a partial cross section illustrating the vehicle driving apparatus 1 and including the cross section of the rear cover 6 taken along the line IV-IV in FIG. 3, and FIG. 5 shows a partial cross section illustrating the vehicle driving apparatus 1 and including the cross section of the rear cover 6 taken along the line V-V in FIG. 3. In the following sections, the description will be made of the cross section of the opening 12 corresponding to the gear shaft 70, and the cross sections of the openings 13 and 14 corresponding to the gear shafts 80 and 90 have the same configuration as that of the opening 12 and will therefore not be described in detail.

The right housing 10 fixes the bearing 40 as a shaft receiver to the inner side of the circular opening 12, as shown in FIG. 4. That is, the inner circumferential surface of the opening 12 is connected to the outer circumferential surface of the outer race 44. Further, the bearing 40 is so connected that one-side end of the gear shaft 70 fits along the inner circumferential surface of the inner race 43. The gear shaft 70 and the inner race 43 are therefore rotatably supported by the right housing 10 via the plurality of balls 45. The rear cover 6 is then so linked to the right housing 10 as to cover the opening 12 in which the shaft receiver described above is provided.

In FIG. 4, the rear cover 6 is so linked that the linkage surface 11 of the right housing 10 and the side surface of the outer race 44 of the bearing 40 come into contact with the portion where the corresponding shaft receiver seat surface 60 and the sealing seat surface 61 are integrated with each other. In contrast, the first recessed section 62 of the rear cover 6, which is separate from the linkage surface 11 of the right housing 10, is not in contact with the gear shaft 70 and the inner race 43. The gear shaft 70 and the inner race 43, which rotate when the input gear 7 is driven, therefore do not experience frictional resistance due to contact with the rear cover 6.

On the other hand, in the portion where the rear cover 6 is connected to the right housing 10 in the cross section taken along the line V-V in FIG. 3, the two through holes 15 formed in the right housing 10 cause the outer race 44 of the bearing 40 to be separate from the right housing 10, as shown in FIG. 5. Further, the two through holes 15 communicate with the first recessed section 62 via the two third recessed sections 64 formed in the inner surface of the rear cover 6 and in the positions corresponding to the through holes 15. That is, the space formed between the bearing 40 and the inner surface of the rear cover 6 communicates with the interior of the right housing 10 through two locations.

In the interior of the right housing 10, the speed reduction mechanism 3 uses a lubricant. Since the interior of the right housing 10 communicates with the space between the bearing 40 and the rear cover 6 through the two locations, as described above, the lubricant can circulate in the space. That is, what is called an oil groove is formed between the right housing 10 and the rear cover 6. The oil groove is formed around each of the bearings 40, 41, and 42, which provide the shaft receiving function of receiving the gear shafts 70, 80, and 90, and can contribute to improvement in smooth action and life of the bearings 40, 41, and 42.

The temperature of the lubricant in the housing structure 5 tends to increase particularly in the vicinity of the bearings 40, 41, and 42, where a large load acts, in accordance with the magnitude of the driving torque produced by the speed reduction mechanism 3. To dissipate the heat from the high-temperature lubricant that circulates along the oil groove described above, the rear cover 6 is provided with a rib structure 65 shown in FIGS. 4 and 5.

The rib structure 65 is formed of protrusions that protrude from the outer surface of the rear cover 6 and increase the surface area of the rear cover 6. The rib structure 65 is specifically formed of linear protrusions extending in the lengthwise direction of the rear cover 6. In the present embodiment, the rib structure 65 may be formed of three protrusions arranged at equal intervals in the height direction of the vehicle, as will be described later.

Figure 6:
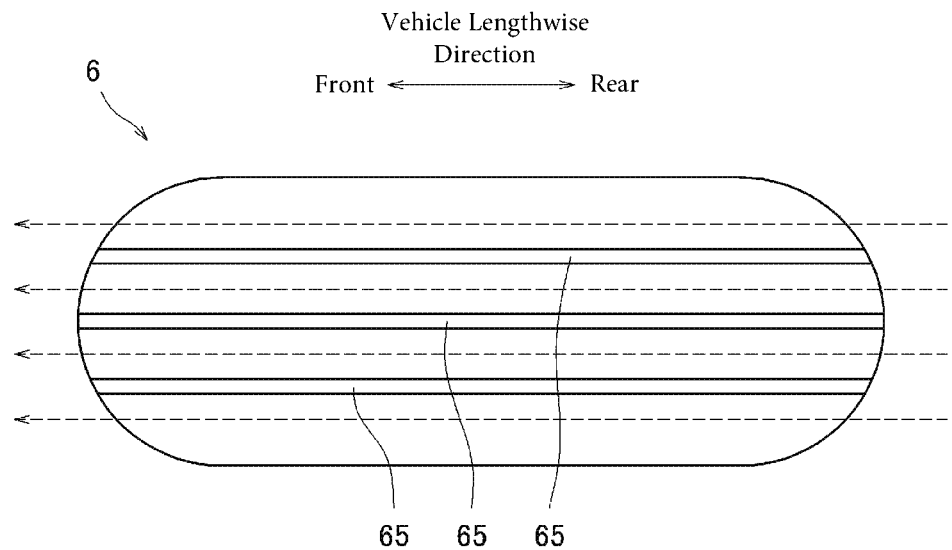
FIG. 6 is a side view showing the outer surface of the rear cover with which the vehicle driving apparatus is provided.

FIG. 6 is a side view showing the outer surface of the rear cover 6, with which the vehicle driving apparatus 1 is provided. The rib structure 65 described above is linearly provided on the outer surface of the rear cover 6 and along the direction in which the vehicle travels, particularly in the present embodiment, the three protrusions are so formed as to extent to the lengthwise (longitudinally) opposite ends of the rear cover 6. The rib structure 65 therefore allows the heat to be dissipated via the outer surface of the rear cover 6 having the increased surface area without blocking air flow indicted by the broken-line arrows in FIG. 6. The rear cover 6 therefore allows efficient dissipation of heat from the high-temperature lubricant in contact with the inner surface of the rear cover 6 so provided as to be adjacent to the speed reduction mechanism 3. It is noted that the number of protrusions that form the rib structure 65 is not limited to three as in the present embodiment, and a smaller number of protrusions may be provided for reduction in the weight of the rear cover 6, or a larger number of protrusions may be provided for higher heat dissipation performance.

The rib structure 65 described above is integrated with the rear cover 6. More specifically, the rib structure 65 is formed as part of the rear cover 6 simultaneously with the formation of the rear cover 6 in aluminum casting. Therefore, the rear cover 6 does not need to be separately provided with a connection member for connecting the rib structure 65, whereby an increase in weight resulting from employment and connection of a heat dissipating mechanism, such as heat dissipating fins, can be avoided. Further, since the rib structure 65 having the heat dissipation function also functions as a reinforcing member, the thickness of the rear cover 6 itself can be reduced for reduction in the weight thereof.

Further, although the rear cover 6 is formed as a thin plate-shaped member, the rib structure 65 formed in the lengthwise direction can prevent deformation, such as lengthwise warpage in the casting step. In a case where a member corresponding to the rib structure 65 is connected to the rear cover 6 in a step after the rear cover 6 having a flat outer surface is formed, the above-mentioned advantage in the manufacturing stage cannot be provided.

As described above, in the vehicle driving apparatus 1 according to the present embodiment, the rear cover 6, which is so provided as part of the housing structure 5 as to be adjacent to the speed reduction mechanism 3, specifically, the inner surface thereof comes into contact with the lubricant heated when the speed reduction mechanism 3 is driven, and the rib structure 65, which increases the surface area of the rear cover 6 without blocking the air flow traveling along the outer surface, is integrated with the rear cover 6. The thus configured vehicle driving apparatus 1 does not need to be newly or separately provided with a heat dissipating mechanism, such as heat dissipating fins or does not need to employ a connection member for attaching the heat dissipating mechanism. Therefore, the vehicle driving apparatus 1 can dissipate heat from the lubricant in the speed reduction mechanism via the housing structure 5 with no increase in weight. Further, the rib structure 65 is linearly provided on the rear cover 6 and along the direction in which the vehicle travels and therefore functions as a member that reinforces the rear cover 6, whereby the thickness and hence the weight of the rear cover 6 can be reduced. Further, the rib structure 65 can prevent deformation of the rear cover 6, for example, lengthwise warpage of the rear cover 6 even when the rear cover 6 is casted in a thin shape, whereby the yield of the rear cover 6 in the manufacturing stage can be improved, which leads to suppression of manufacturing cost. The vehicle driving apparatus 1 according to the present invention therefore allows improvement in performance of heat dissipation from the speed reduction mechanism 3 and reduction in the vehicle weight and manufacturing cost.

Second Embodiment

A second embodiment of the present invention will next be described. The second embodiment differs from the first embodiment described above in terms of the aspect of the rear cover 6. Portions different from those in the first embodiment will be described below, and constituent elements common to those in the first embodiment have the same reference characters and will not be described in detail.

Figure 7:
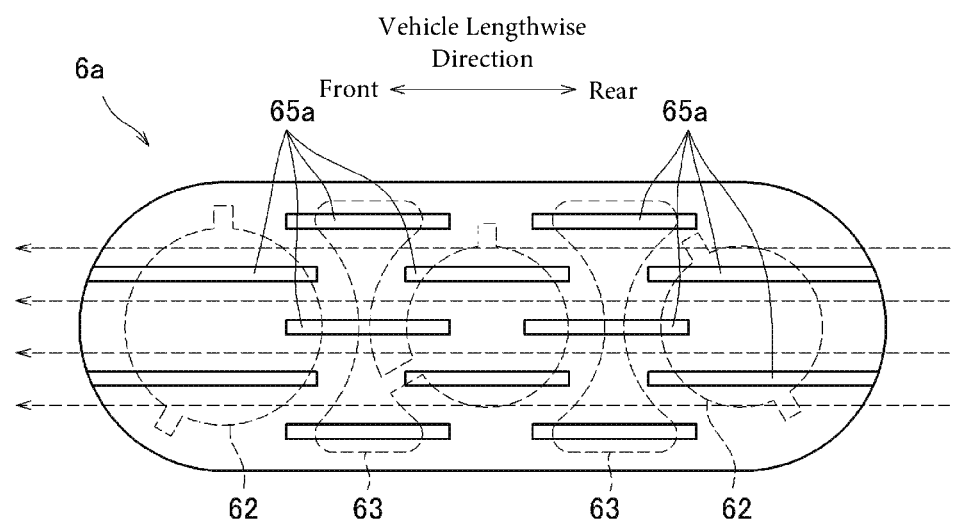
FIG. 7 is a side view showing the outer surface of a rear cover according to a second embodiment.

FIG. 7 is a side view showing the outer surface of a rear cover 6a according to the second embodiment. The rear cover 6a is so configured that the structure of the inner surface thereof is the same as the configuration of the rear cover 6 in the first embodiment described above, and the first recessed sections 62 and the second recessed sections 63 are drawn with broken lines.

A plurality of partial ribs 65a are provided on the outer surface of the rear cover 6a and along the direction in which the vehicle travels. The plurality of partial ribs 65a are so arranged as to overlap with each other along the direction in which the vehicle travels. The rear cover 6a is therefore seamlessly reinforced by the partial ribs 65a in the lengthwise direction, and the air flow produced when the vehicle travels is not blocked by the plurality of partial ribs 65a.

Further, in comparison of the form of the rear cover 6a with the form of the rear cover 6 in the first embodiment described above, in which the rib structure 65 continuously extends in the lengthwise direction, the partial ribs 65a can be arranged with increased flexibility. The thus configured rear cover 6a allows increase in the number of partial ribs 65a arranged in the regions where the second recessed sections 63 are formed for intensive reinforcement of the regions. Further, the rear cover 6a also, for example, allows increase in the number of partial ribs 65a arranged in a region where a greater heat dissipation effect is required but decrease in the number of partial ribs 65a in the other region for improvement in the heat dissipation efficiency with no increase in the weight of the rear cover. The vehicle driving apparatus 1 according to the second embodiment of the present invention can therefore effectively provide the same advantageous effects provided by the first embodiment described above.

Third Embodiment

A third embodiment of the present invention will next be described. The third embodiment differs from the first embodiment described above in terms of the aspect of the rear cover 6. Portions different from those in the first embodiment will be described below, and constituent elements common to those in the first embodiment have the same reference characters and will not be described in detail.

Figure 8:
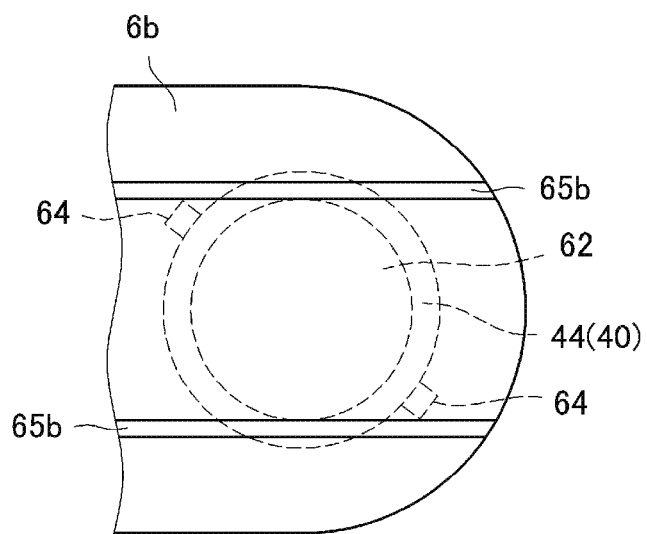
FIG. 8 is a side view showing part of the outer surface of a rear cover according to a third embodiment.

FIG. 8 is a side view showing part of the outer surface of a rear cover 6b according to the third embodiment. In more detail, FIG. 8 is a side view showing the position of the gear shaft 70 in the first embodiment corresponding to the bearing 40 as a shaft receiver and viewed from the side facing the outer surface of the rear cover 6b.

The rear cover 6b has a contact surface that is part of the inner surface of the rear cover 6b and comes into contact with the side surface of the outer race 44 of the bearing 40, as in the first embodiment described above. A rib structure 65b according to the third embodiment is so disposed that the area where the contact surface and the rib structure 65b overlaps with each other is maximized in a plan view of the opposite surfaces of the rear cover 6b. That is, in the present embodiment, out of the broken-line double circles showing the outer race 44 in FIG. 8, the rib structure 65b is configured to be in contact with the inner broken line. The third recessed sections 64 are so located as not to overlap with the rib structure 65b.

Figure 9:
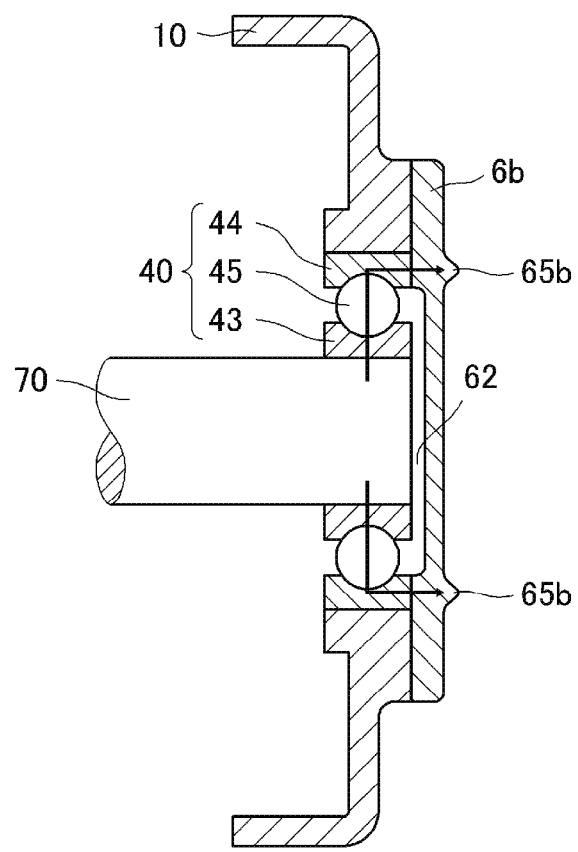
FIG. 9 is a cross-sectional view of the rear cover according to the third embodiment.

FIG. 9 is a cross-sectional view of the rear cover 6b according to the third embodiment. In more detail, FIG. 9 is a cross-sectional view of the rear cover 6b according to the third embodiment taken along the same line IV-IV in FIG. 3. As described above, the bearing 40 as a shaft receiver is a portion where increase in temperature tends to occur because a large load particularly acts on the bearing 40 in accordance with the magnitude of the driving torque produced by the speed reduction mechanism 3. The outer race 44 of the bearing 40 releases the heat of the bearing 40 via the surface where the outer race 44 is in contact with the rear cover 6b and out of the rib structure 65b. In this process, the arrangement described above in which the area where the contact surface and the rib structure 65b overlap with each other is maximized allows the heat of the bearing 40 to be efficiently dissipated along the heat path where metals are in contact with each other, as indicated by the arrows in FIG. 9.

The invention claimed is:

1. A vehicle driving apparatus comprising:
a motor incorporated in a vehicle;
a speed reduction mechanism that transmits driving force produced by the motor to a differential gear of the vehicle; and
a housing structure that accommodates the speed reduction mechanism and the differential gear, wherein
the housing structure includes a cast plate member so provided as to be adjacent to the speed reduction mechanism, and a rib structure provided on the cast plate member,
the rib structure is provided along a direction in which the vehicle travels and integrated with the cast plate member,
the cast plate member has a contact surface that comes into contact with a shaft receiver that supports the speed reduction mechanism, and
the rib structure is so disposed that an area where the rib structure and the contact surface overlap with each other is maximized in a plan view of the cast plate member.

2. A vehicle driving apparatus comprising:
a motor incorporated in a vehicle;
a speed reduction mechanism that transmits driving force produced by the motor to a differential gear of the vehicle; and
a housing structure that accommodates the speed reduction mechanism and the differential gear, wherein
the housing structure includes a cast plate member so provided as to be adjacent to the speed reduction mechanism, and a rib structure provided on the cast plate member,
the rib structure is provided along a direction in which the vehicle travels and integrated with the cast plate member,
the rib structure includes a plurality of partial ribs provided along the direction in which the vehicle travels, and the plurality of partial ribs are so arranged as to overlap with each other in the direction in which the vehicle travels,
the cast plate member has a contact surface that comes into contact with a shaft receiver that supports the speed reduction mechanism, and
the rib structure is so disposed that an area where the rib structure and the contact surface overlap with each other is maximized in a plan view of the cast plate member.

* * * * *